(12) United States Patent
Bitar et al.

(10) Patent No.: US 8,046,119 B2
(45) Date of Patent: Oct. 25, 2011

(54) METHOD OF INDICATING THE LATERAL MANOEUVRE MARGINS ON EITHER SIDE OF THE FLIGHT PLAN PATH OF AN AIRCRAFT

(75) Inventors: Elias Bitar, Toulouse (FR); Nicolas Marty, Castelginest (FR)

(73) Assignee: Thales (FR)

( * ) Notice: Subject to any disclaimer, the term of this patent is extended or adjusted under 35 U.S.C. 154(b) by 1345 days.

(21) Appl. No.: 11/629,867

(22) PCT Filed: Jun. 3, 2005

(86) PCT No.: PCT/EP2005/052561
§ 371 (c)(1),
(2), (4) Date: Dec. 18, 2006

(87) PCT Pub. No.: WO2005/123443
PCT Pub. Date: Dec. 29, 2005

(65) Prior Publication Data
US 2008/0046171 A1    Feb. 21, 2008

(30) Foreign Application Priority Data
Jun. 18, 2004    (FR) .................................... 04 06652

(51) Int. Cl.
*G01C 23/00* (2006.01)
*G05D 1/10* (2006.01)
*G06F 19/00* (2011.01)

(52) U.S. Cl. ................... 701/14; 701/4; 701/8; 340/973; 340/971

(58) Field of Classification Search ................ 701/4, 10, 701/14, 301, 8; 340/970, 977, 973, 971; 244/175
See application file for complete search history.

(56) References Cited

U.S. PATENT DOCUMENTS

| | | | |
|---|---|---|---|
| 4,144,571 A * | 3/1979 | Webber | 701/217 |
| 5,892,462 A | 4/1999 | Tran et al. | |
| 6,021,374 A * | 2/2000 | Wood | 701/301 |
| 6,088,654 A * | 7/2000 | Lepere et al. | 701/301 |
| 6,469,664 B1 * | 10/2002 | Michaelson et al. | 342/357.31 |
| 6,690,298 B1 * | 2/2004 | Barber et al. | 340/971 |
| 7,173,545 B2 | 2/2007 | Berthe | |
| 7,209,052 B2 * | 4/2007 | Artini et al. | 340/970 |
| 7,428,451 B2 * | 9/2008 | Artini et al. | 701/9 |
| 2003/0195672 A1 * | 10/2003 | He | 701/3 |
| 2003/0222887 A1 | 12/2003 | Wilkins et al. | |
| 2004/0215372 A1 * | 10/2004 | Bateman et al. | 701/1 |

FOREIGN PATENT DOCUMENTS

FR    2842594 A    1/2004

* cited by examiner

*Primary Examiner* — Thomas Black
*Assistant Examiner* — Christine Behncke
(74) *Attorney, Agent, or Firm* — Lowe Hauptman Ham & Berner, LLP

(57) ABSTRACT

The parts of the flight plan of an aircraft corresponding to lateral trajectories at low altitude can comprise passages with limited lateral freedom of deployment because of risks of collision with the ground, or because of obstacles on the ground. The method makes it possible to signal them for the attention of the crew, so that said crew should redouble their attention. To do this it uses the display, on an onboard navigation screen, of a vertical profile of margin of maneuver relating to the navigation band widened to the right and to the left by lateral margins of maneuver, superimposed on the vertical navigation profile relating only to the navigation band.

7 Claims, 2 Drawing Sheets

METHOD OF INDICATING THE LATERAL MANOEUVRE MARGINS ON EITHER SIDE OF THE FLIGHT PLAN PATH OF AN AIRCRAFT

CROSS-REFERENCE TO RELATED APPLICATIONS

The present application is based on International Application No. PCT/EP2005/052561, filed on Jun. 3, 2005, which in turn corresponds to France Application No. 04 06652 filed Jun. 18, 2004, and priority is hereby claimed under 35 USC §119 based on these applications. Each of these applications are hereby incorporated by reference in their entirety into the present application.

FIELD OF THE INVENTION

The present invention relates to onboard navigation aid for aircraft following a flight plan part corresponding to a trajectory at low altitude that may comprise passages with limited lateral freedom of deployment because of risks of collision with the ground. It relates to the display, on a navigation screen, of the passages of the trajectory of the flight plan subject to limitations of lateral freedom of deployment.

DESCRIPTION OF THE RELATED ART

Currently, it is known to display two images simultaneously on a navigation screen of the instrument panel of an aircraft: a first image showing a map of the region overflown with, superimposed thereon, the position of the aircraft and the ground trace of the part to be traversed of the trajectory scheduled in the flight plan, and a second image showing the relative height of the aircraft with respect to a vertical navigation profile which catalogues the largest terrain elevations encountered along a terrain band centered on the trajectory scheduled in the flight plan, termed the navigation band. The terrain elevations of the region overflown are catalogued in a topographic database onboard or consultable from the aircraft. The navigation band has a width, on either side of the ground trace of the trajectory scheduled in the flight plan, taking account of the uncertainties of location of the aircraft, of the inaccuracies of the topographic database and of the lateral tolerance allowed in the tracking of the trajectory scheduled in the flight plan.

The vertical navigation profile advises the crew of the aircraft on the margin of height above the ground that the aircraft possesses as a function of its position on the trajectory scheduled in the flight plan and of its current altitude given by its onboard instruments but it does not give any indication on the environment close to the navigation band which may, when the aircraft is at low altitude, limit its lateral freedom of deployment.

To respond to this requirement, the Applicant has already proposed, in a French patent application FR 2.842.594, an onboard navigation aid system for aircraft alerting the crew of an aircraft as to the time remaining for it to embark on lateral disengagement maneuvers, when limitations to its lateral margins of maneuver are detected on one side or the other of a dummy trajectory that may be its short-term forecastable trajectory. This onboard system borrows, while adapting it, the principle of the ground proximity warning systems of the TAWS type (the acronym standing for the expression: "Terrain Awareness and Warning System"). It is based on the penetration of the relief or any obstacle on the ground, into two lateral protection volumes tied to the aircraft and dimensioned as a function of the current position of the aircraft as well as its speed and acceleration vectors at the time. The relief and the obstacles on the ground are catalogued in a topographic map of the region overflown formulated on the basis of a topographic database onboard or consultable from the aircraft. The lateral protection volumes tied to the aircraft are dimensioned so as to contain the volumes necessary for lateral disengagement maneuvers.

This is a system demanding, like all TAWS systems, relatively significant calculation power.

SUMMARY OF THE INVENTION

In view of the foregoing it is an object of this invention to advise, at a lesser lost, the crew of an aircraft as to the passages of the trajectory scheduled in its flight plan where it will encounter limitations of its lateral margins of maneuver.

Briefly stated, the present invention is directed to a method for signaling the lateral margins of maneuver that exist on either side of a trajectory scheduled in the flight plan of an aircraft furnished with a locating device and having access to a terrain elevation database, noteworthy in that it consists in displaying, on a navigation screen, with the vertical navigation profile giving the largest terrain elevations catalogued in the terrain elevation database, encountered on the trajectory scheduled in the flight plan, along a navigation band whose width takes account of the uncertainties of location of the aircraft, of the inaccuracy of the terrain elevation database and of the lateral tolerance allowed in the tracking of the trajectory scheduled in the flight plan, a vertical profile of lateral navigation margins giving the largest terrain elevations catalogued in the terrain elevation database, encountered on the trajectory scheduled in the flight plan, along a widened navigation band consisting of the navigation band itself, supplemented with right and left lateral margins of maneuver.

Advantageously, the right and left lateral margins of maneuver are dimensioned so as to delimit sufficient areas to contain the ground traces of disengagement maneuvers comprising at least one half-revolution performed, by the aircraft, flat, to the right or to the left of the trajectory scheduled in the flight plan.

Advantageously, the right and left lateral margins of maneuver are dimensioned so as to delimit sufficient areas to contain the ground traces of disengagement maneuvers comprising at least one half-revolution performed, by the aircraft, flat, to the right or to the left of the trajectory scheduled in the flight plan, doing so having regard to the local wind.

Advantageously, the right and left lateral margins of maneuver are dimensioned so as to delimit sufficient areas to contain the ground traces of disengagement maneuvers comprising at least one half-revolution performed, by the aircraft, flat, with an imposed turning radius, to the right or to the left of the trajectory scheduled in the flight plan.

Advantageously, the right and left lateral margins of maneuver are dimensioned so as to delimit sufficient areas to contain the ground traces of disengagement maneuvers comprising at least one half-revolution performed, by the aircraft, with an imposed turning radius, to the right or to the left of the trajectory scheduled in the flight plan, doing so having regard to the local wind.

Advantageously, the turning radius imposed for the disengagement maneuvers, to the right and to the left, is a permitted minimum turning radius for the aircraft considered.

Advantageously, the lateral dimensions of the margins of maneuver are dependent on the imposed turning radius and the positions, with respect to the aircraft, of the points of the ground traces of the turns with the imposed radius corresponding, for the aircraft, to a vanishing of its speed component perpendicular to the course scheduled in the flight plan.

Advantageously, the lateral dimensions of the margins of maneuver are taken to be equal, for one, the right one $W_r$, to the largest value out of:
the turning diameter 2R whose value is given by:

$$R = \frac{TAS^2}{g \cdot \tan\varphi_{roll}},$$

TAS being the amplitude of the air speed of the aircraft, $\phi_{roll}$ being the angle of roll of the aircraft during the turning maneuver, and the values taken by the component $x_t$ perpendicular to the course scheduled in the flight plan on the ground trace of the turn with imposed radius, at the times $t_{Wr1}$ and $t_{Wr2}$ of the first and second vanishings of the aircraft's speed component perpendicular to the course scheduled in the flight plan, $W_r=\text{Max}[2R;x_t(t_{Wr1});x_t(t_{Wr2})]$ with $\delta=+1$ and for the other, the left one $W_l$, the largest of the values out of:
the turning diameter 2R, and,
the opposites of the values taken by the component $x_t$ perpendicular to the course scheduled in the flight plan on the ground trace of the turn with imposed radius, at the times $t_{Wl1}$ and $t_{Wl2}$ of the first and second vanishings of the aircraft's speed component perpendicular to the course scheduled in the flight plan $W_l=\text{Max}[2R;-x_t(t_{Wl1});-x_t(t_{Wl2})]$ with $\delta=-1$

BRIEF DESCRIPTION OF THE DRAWINGS

Other characteristics and advantages of the invention will emerge from the description hereafter of an exemplary embodiment. This description will be offered in relation to the drawing in which:

a FIG. 1 is a view from above, of a navigation band and of the right and left lateral margins according to the invention, a FIG. 2 is a view of a vertical navigation profile supplemented, in accordance with the invention, with a vertical profile of lateral margins, a FIG. 3 illustrates, in horizontal projection, circular trajectories corresponding to flat turns performed by the aircraft, at constant speed and constant angle of roll in the absence of local wind, and a FIG. 4 illustrates the deformations, in the form of cycloidal arches, of the ground traces of the circular trajectories shown in FIG. 3 resulting from the presence of a local crosswind.

DETAILED DESCRIPTION OF THE EMBODIMENTS

Figure 1:
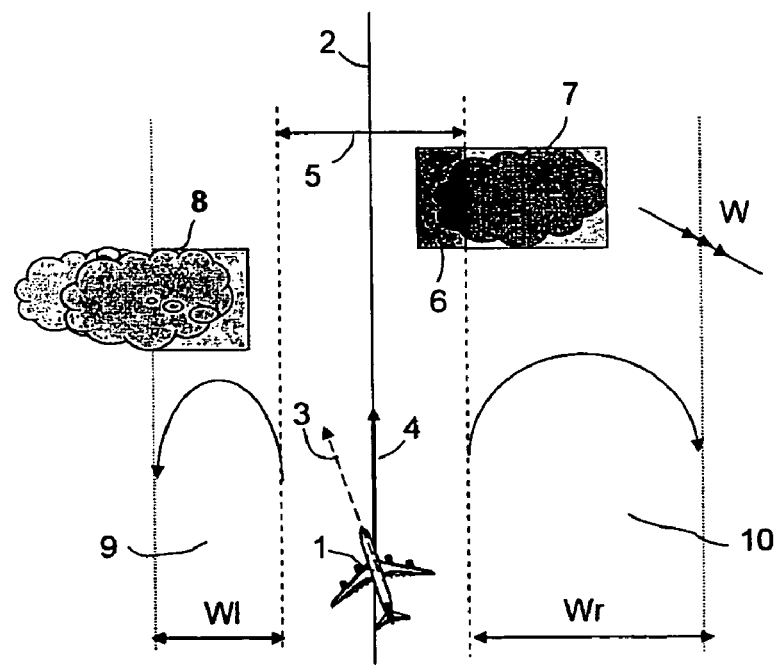

FIG. 1 shows, in horizontal projection and viewed from above, an aircraft 1 following an actual trajectory 2. Its heading 3 is different from its course (track) 4 following the axis of the projection on the ground of its actual trajectory 2 because of a local crosswind W. During the conduct of a flight plan, the envisaged trajectory is never followed exactly, on account of the inaccuracy of the aircraft's onboard locating devices, of the inaccuracy of the terrain elevation database serving for the formulation of the maps used for the plotting and the tracking of the trajectory scheduled in the flight plan and of the tolerance allowed in the lateral trajectory tracking. When the aircraft 1 follows the trajectory scheduled in its flight plan, the only certainty is that it is situated above a terrain band termed the navigation band 5 extending on each side of the trajectory scheduled in the flight plan over a width corresponding to the aggregate sum of the uncertainty of lateral location of the aircraft with respect to its course, of the inaccuracies of the maps used for the plotting and the tracking of the trajectory scheduled in the flight plan and of the tolerance allowed in the lateral trajectory tracking. It is important that the safety floor associated with a position of the aircraft 1 traveling along the trajectory scheduled in the flight plan remains above the reliefs and obstacles on the ground charted in the navigation band.

When a relief or obstacle on the ground 6 crosses the safety floor at the level of the navigation band, there is a risk of collision with the ground and it is necessary to depart from the tracking of the trajectory scheduled in the flight plan through an avoidance maneuver.

This kind of risk can be detected by a ground proximity warning system of the TAWS type but so can it be by the crew of the aircraft by virtue of a monitoring of the position of an index of relative height of the aircraft in the image of the vertical navigation profile displayed on the navigation screen of the instrument panel of the aircraft since this vertical navigation profile shows the largest terrain elevation values encountered on the navigation band along the whole of the trajectory scheduled in the flight plan.

When a relief or obstacle on the ground 7, 8 crosses the safety floor in the immediate neighborhood of the navigation band, there is no risk of collision with the ground if the aircraft merely follows the trajectory scheduled in the flight plan. On the other hand, there is restriction of the lateral margins of deployment of the aircraft 1 when it passes in proximity. This is not indicated by a ground proximity warning system of the TAWS type and does not appeal to the study of the relative position of the index of relative height of the aircraft with respect to the vertical navigation profile in the image displayed on the navigation screen of the instrument panel. But it is beneficial that the crew of the aircraft be aware of the limitations to their lateral margins of maneuver to avoid unfortunate disengagement maneuvers.

To do this, it is proposed that lateral margins 9, 10 of sufficient width for the aircraft to be able to make a half-revolution, flat, with an imposed turning radius, be added to the right and to the left of the navigation band 5 and that a vertical profile of lateral margins showing the largest terrain elevation values encountered on the navigation band and the lateral margins of maneuver along the whole of the trajectory scheduled in the flight plan be superimposed on the vertical navigation profile displayed on the navigation screen of the instrument panel.

Figure 2:
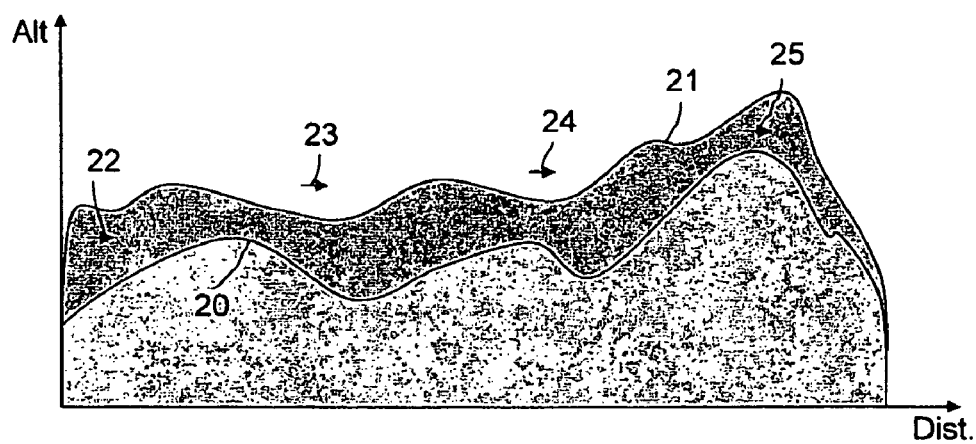

FIG. 2 illustrates an exemplary graphic usable on an aircraft instrument panel navigation screen to depict, in a superimposed manner, the vertical navigation and lateral margin profiles. In this graphic, the vertical navigation and lateral margin profiles are represented by curves 20, 21 of the functions giving the value of the maximal terrain elevation logged on a transverse section of the navigation band alone or with the lateral margins 9, 10 as a function of the distance traversed on the trajectory scheduled in the flight plan. For better readability, the area lying between the curve 20 of the vertical navigation profile and the distance axis is hatched differently from that lying between the curves 20 and 21 of the two vertical profiles. It is noted that curve 20 of the vertical profile of the navigation band always remains below that 21 of the vertical profile of the lateral margins which is taken on a band of larger width. Various examples of positions 22 to 25 are given for the index of relative height of the aircraft. When the index of relative height of the aircraft is in the positions 22 or

25, the safety floor of the aircraft is above the reliefs or obstacles on the ground of the part overflown of the navigation band but certain reliefs or obstacles on the ground that are laterally close to the navigation band are above the safety floor; there are therefore limitations of lateral margin of maneuver. When the index of relative height of the aircraft is in the positions 23 or 24, the safety floor of the aircraft is above any relief or obstacle on the ground that are close; there is therefore no limitation of the lateral margins of maneuver.

For the formulation of the vertical profiles 20, 21 of the navigation band and of the lateral margins, the terrain elevations are derived from a database of terrain elevations as a function of the plot of the trajectory scheduled in the flight plan and of the widths allowed for the navigation band 5 alone and the navigation band 5 increased by the lateral margins 9 and 10.

To fix the lateral dimensions of the right and left margins 9, 10, the basis therefor is an estimation of the lateral dimensions of the horizontal areas occupied by the ground trace of the trajectory traversed by the aircraft when it performs at least one half-revolution, flat, by tightening the turn to the maximum permitted and in the presence of a local wind. For this estimation, one begins by establishing the parametric equations of the ground trace in the absence of local wind, then, in the presence of local wind, in reference frames tied to the course of the aircraft (track) and to the longitude and latitude axes. One is interested thereafter in the points of this trace where the lateral speed (perpendicular to the course scheduled in the flight plan) vanishes.

Figure 3:
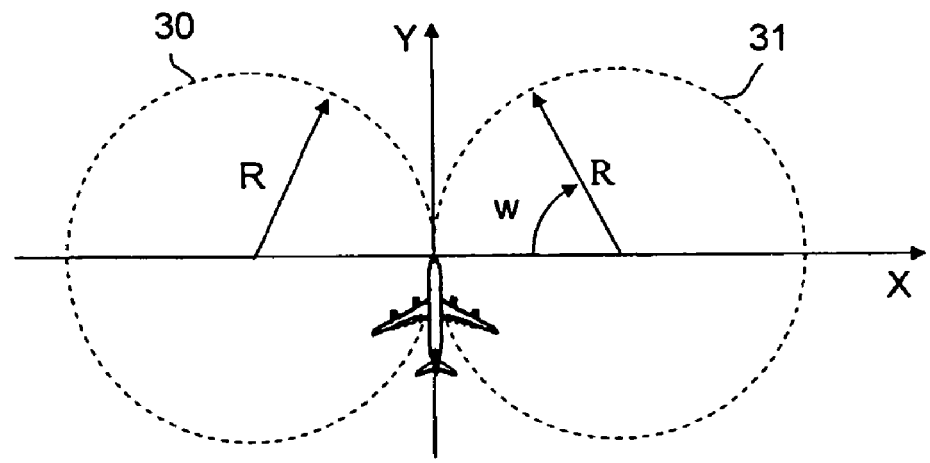

As represented in FIG. 3, in the absence of local wind, the trajectories of the aircraft performing a complete revolution, flat, from a point of the trajectory scheduled in the flight plan, by tightening the turn to the permitted maximum, on the right side, or on the left side are circles 30, 31 passing through the starting position on the trajectory scheduled in the flight plan, having a common tangent oriented according to the heading of the aircraft (vector Y) and a radius R corresponding to the smallest acceptable turning radius at the time. These circles 30, 31, which represent the tightest permitted turning trajectories, on one side or the other, for the aircraft, comply with the system of parametric equations:

$$\begin{pmatrix} x \\ y \end{pmatrix}(t) = \begin{pmatrix} \delta \cdot R \cdot [1 - \cos(wt + \gamma)] \\ R \cdot \sin(wt + \gamma) \end{pmatrix} \quad (1)$$

with $$R = \frac{TAS^2}{g \cdot \tan\varphi_{roll}}$$

$$w = \frac{TAS}{R} = \frac{g \cdot \tan\varphi_{roll}}{TAS}$$

TAS being the amplitude of the air speed of the aircraft,
g being the acceleration due to gravity,
$\varphi_{roll}$ being the angle of roll of the aircraft during the maneuver,
$\gamma$ being a factor dependent on the initial conditions,
$\delta$ being a coefficient equal to +1 for a turn to the right and −1 for a turn to the left.
The air speed of the aircraft, when it traverses these circles may then be written:

$$\begin{pmatrix} \dot{x} \\ \dot{y} \end{pmatrix}_t (t) = \begin{pmatrix} \delta \cdot Rw \cdot \sin(wt + \gamma) \\ Rw \cdot \cos(wt + \gamma) \end{pmatrix} \quad (2)$$

Figure 4:
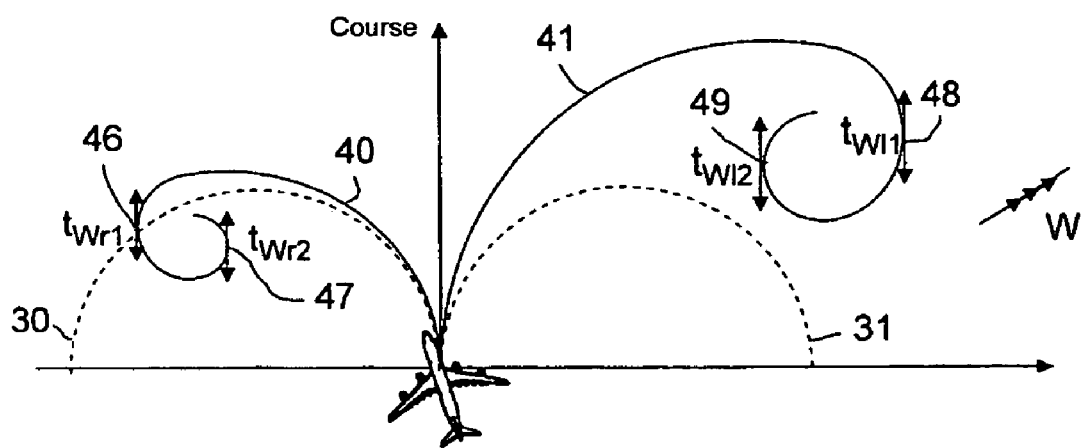

In the presence of a local wind that is constant in speed and in direction, the circles 30, 31 leave traces 40, 41 on the ground in the form of cycloidal arches, as is represented in FIG. 4. The system of parametric equations of a ground trace can be obtained by integrating the system of parametric equations for the air speed of traversal over the corresponding circle.

When the wind is taken into account, the system (2) of parametric equations for the speed of the aircraft, expressed in a ground reference frame X Y whose ordinate axis Y is oriented according to the heading of the aircraft, becomes:

$$\begin{pmatrix} \dot{x} \\ \dot{y} \end{pmatrix}(t) = \begin{pmatrix} \delta \cdot Rw \cdot \sin(wt + \gamma) + WS_X \\ Rw \cdot \cos(wt + \gamma) + WS_Y \end{pmatrix}$$

$$\begin{pmatrix} WS_X \\ WS_Y \end{pmatrix} \text{ being the wind vector.}$$

By integration, we obtain, in this ground reference frame, the system of parametric equations for the trace:

$$\begin{pmatrix} x \\ y \end{pmatrix}(t) = \begin{pmatrix} WS_X \cdot t - \delta \cdot R \cdot \cos(wt + \gamma) + C_X \\ WS_Y \cdot t + R \cdot \sin(wt + \gamma) + C_Y \end{pmatrix}$$

$C_x$ and $C_y$ being integration constants which depend on the reference frame considered.

In an air reference frame $X_h$, $Y_h$ whose ordinate axis Y is oriented according to the heading of the aircraft the system of parametric equations (2) becomes:

$$\begin{pmatrix} \dot{x} \\ \dot{y} \end{pmatrix}(t) = \begin{pmatrix} \delta \cdot Rw \cdot \sin(wt + \gamma) + WS_{X_h} \\ Rw \cdot \cos(wt + \gamma) + WS_{Y_h} \end{pmatrix} \quad (3)$$

By integration, it gives, in this air reference frame, the system of parametric equations for the ground trace:

$$\begin{pmatrix} x \\ y \end{pmatrix}_h (t) = \begin{pmatrix} WS_{X_h} \cdot t - \delta \cdot R \cdot \cos(wt + \gamma_h) + C_{X_h} \\ WS_{Y_h} \cdot t + R \cdot \sin(wt + \gamma_h) + C_{Y_h} \end{pmatrix} \quad (4)$$

The initial condition regarding position is:

$$\begin{pmatrix} x \\ y \end{pmatrix}_{t=0} = \begin{pmatrix} 0 \\ 0 \end{pmatrix} \quad (5)$$

since the aircraft is initially at the center of the reference frame. The initial condition regarding speed is:

$$\begin{pmatrix} \dot{x} \\ \dot{y} \end{pmatrix}_{t=0} = \begin{pmatrix} WS_{X_h} \\ TAS + WS_{Y_h} \end{pmatrix} \quad (6)$$

since the aircraft has a speed vector oriented initially according to the course axis $\vec{t}$.

At the initial instant t=0, the equation system (3) gives for initial air speed:

$$\begin{pmatrix} \dot{x} \\ \dot{y} \end{pmatrix}_{t=0} = \begin{pmatrix} \delta \cdot Rw \cdot \sin(\gamma) + WS_{X_h} \\ Rw \cdot \cos(\gamma) + WS_{Y_h} \end{pmatrix} \quad (5)$$

The initial speed condition (relation 6) implies:

$$\begin{cases} \cos(\gamma_h) = 1 \\ \sin(\gamma_h) = 0 \end{cases} \Rightarrow \gamma_h = 0$$

Taking account of these relations in the system of equations (4), it follows that:

$$\begin{pmatrix} x \\ y \end{pmatrix}_h (0) = \begin{pmatrix} -\delta \cdot R \cdot + C_{X_h} \\ C_{Y_h} \end{pmatrix}$$

and the initial position condition (relation 5) implies:

$C_{X_h} = \delta \cdot R$ $C_{y_h} = 0$

In a ground reference frame $X_t Y_t$, whose ordinate axis $Y_t$ is oriented according to the course (track) of the aircraft (case of FIG. 4), the system of parametric equations (2) becomes:

$$\begin{pmatrix} \dot{x} \\ \dot{y} \end{pmatrix}_t (t) = \begin{pmatrix} \delta \cdot Rw \cdot \sin(wt + \gamma_t) + WS_{X_t} \\ Rw \cdot \cos(wt + \gamma_t) + WS_{Y_t} \end{pmatrix} \quad (7)$$

By integration, it gives, in this ground reference frame, the system of parametric equations for the trace:

$$\begin{pmatrix} x \\ y \end{pmatrix}_t (t) = \begin{pmatrix} WS_{X_t} \cdot t - \delta \cdot R \cdot \cos(wt + \gamma_t) + C_{X_t} \\ WS_{Y_t} \cdot t + R \cdot \sin(wt + \gamma_t) + C_{Y_t} \end{pmatrix} \quad (8)$$

The initial position condition:

$$\begin{pmatrix} x \\ y \end{pmatrix}_t (0) = \begin{pmatrix} 0 \\ 0 \end{pmatrix}$$

expressing that the aircraft is initially at the center of the reference frame, and the initial speed condition:

$$\begin{pmatrix} \dot{x} \\ \dot{y} \end{pmatrix}_t (0) = \begin{pmatrix} 0 \\ GS \end{pmatrix}$$

expressing that the aircraft has a speed vector oriented initially according to the course axis $\vec{t}$ lead to the values of integration constants:

$C_{X_t} = \delta \cdot R \cdot \cos(\gamma_t)$ $C_{Y_t} = -R \cdot \sin(\gamma_t)$ $\gamma_t = \delta \cdot (\text{Track} - \text{Heading})$ In the customary geographical reference frame of navigation maps $X_g Y_g$ which uses longitude and latitude axes, the system of parametric equations (1) becomes:

$$\begin{pmatrix} \dot{x} \\ \dot{y} \end{pmatrix}_g (t) = \begin{pmatrix} \delta \cdot Rw \cdot \sin(wt + \gamma_g) + WS_{X_g} \\ Rw \cdot \cos(wt + \gamma_g) + WS_{Y_g} \end{pmatrix}$$

By integration, it gives, in this geographical reference frame, the system of parametric equations for the trace:

$$\begin{pmatrix} x \\ y \end{pmatrix}_g (t) = \begin{pmatrix} WS_{X_g} \cdot t - \delta \cdot R \cdot \cos(wt + \gamma_g) + C_{X_g} \\ WS_{Y_g} \cdot t + R \cdot \sin(wt + \gamma_g) + C_{Y_g} \end{pmatrix}$$

The initial position condition:

$$\begin{pmatrix} x \\ y \end{pmatrix}_g (0) = \begin{pmatrix} \text{Long} \\ \text{Lat} \end{pmatrix}$$

and the initial speed condition:

$$\begin{pmatrix} \dot{x} \\ \dot{y} \end{pmatrix}_g (0) = \begin{pmatrix} GS \cdot \sin(\text{track}) \\ GS \cdot \cos(\text{track}) \end{pmatrix}$$

lead to the values of integration constants:

$C_{X_g} = \text{Long} + \delta \cdot R \cdot \cos(\gamma_g)$ $C_{Y_g} = \text{Lat} - R \cdot \sin(\gamma_g)$ $\gamma_g = \delta \cdot \text{Heading} + k \cdot \Pi$ The system (7) of parametric equations for the speed in the ground reference frame $X_t Y_t$ makes it possible to evaluate the lateral dimensions of the horizontal maneuvering areas required by the aircraft to perform a half-revolution to the right or to the left.

Specifically, if we assume that the real air speed of the aircraft is greater than that of the local wind, the lateral speed of the aircraft describing one or the other of the cycloidal arches corresponding to a turn to the right or to the left vanishes periodically. FIG. 4 shows this phenomenon in the particular case of a crosswind W. Distinguished therein, on the first cycloidal arch of each trace 40, 41, are two positions 46, 47 for the trace 40 of the turn to the left and 48, 49 for the trace 41 of the turn to the right where the lateral speed vanishes.

The traversal times $t_{W1}$, and $t_{W2}$ required by the aircraft to reach the positions of the first and second vanishings of lateral speed 46, 47 or 48, 49 on a trace 40 or 41 are deduced from the relation derived from the system (7) of parametric equations:

$(\dot{x})_t(t) = (\delta \cdot Rw \cdot \sin(wt + \gamma) + WS_{X_t})$ with:

$(\dot{x})_t(t) = 0$

It follows that:

$$\begin{pmatrix} t_{W1} \\ t_{W2} \end{pmatrix} = \begin{cases} \frac{1}{w} \left[ \arcsin\left(-\delta \frac{WS_{X_t}}{TAS} - \gamma_t\right) + 2k \cdot \Pi \right] \\ \frac{1}{w} \left[ -\arcsin\left(-\delta \frac{WS_{X_t}}{TAS} - \gamma_t\right) + 2(k+1) \cdot \Pi \right] \end{cases}$$

with the integer k such that:

$$t = \begin{cases} wt > 0 \\ wt \le 2 \cdot \Pi \end{cases} \quad 5$$

and the abscissae $x_t(t_{W1})$ and $x_t(t_{W2})$ of the equations:

$$x_t(t_{W1}) = WS_{Wt} \cdot t_{W1} - \delta \cdot R \cdot \cos(wt_{W1} + \gamma_t) + \delta \cdot R \cdot \cos(\gamma_t)$$

$$x_t(t_{W2}) = WS_{Xt} \cdot t_{W2} - \delta \cdot R \cdot \cos(wt_{W2} + \gamma_t) + \delta \cdot R \cdot \cos(\gamma_t)$$

derived from the system (8) of parametric equations for the ground trace, with:

$$\gamma_t = -\delta \cdot (\text{Track} - \text{Heading})$$

Because of the large variety of the possible shapes of the cycloidal arches of the traces 40 and 41, we choose, for the lateral dimension $W_r$ of the right margin of maneuver the larger value out of:

the turning diameter 2R whose value is given by the relation:

$$R = \frac{TAS^2}{g \cdot \tan\varphi_{roll}}, \text{ and}$$

the values taken by the component $x_t$ of the system of parametric equations (8) for the ground trace at the times $t_{Wr1}$ and $t_{Wr2}$ $$W_r = \text{Max}[2R; x_t(t_{Wr1}); x_t(t_{Wr2})] \text{ with } \delta = +1$$

and for the lateral dimension $W_l$ of the left margin of maneuver, the larger out of:

the turning diameter 2R, and the opposites of the values taken by the component $x_t$ of the system of parametric equations (8) for the ground trace at the times $t_{Wl1}$ and $t_{Wl2}$ (to take account of their negative signs in the terrestrial reference frame t)

$$W_l \text{Max}[2R; -x_t(t_{Wl1}); -x_t(t_{Wl2})] \text{ with } \delta = -1$$

The invention claimed is:

1. A method for signaling the lateral margins of maneuver that exist on either side of a trajectory scheduled in a flight plan of an aircraft furnished with a locating device and having access to a terrain elevation database, comprising the steps of:

displaying, on a navigation screen, with the vertical navigation profile giving the largest terrain elevations catalogued in the terrain elevation database, encountered on the trajectory scheduled in the flight plan, along a navigation band whose width takes account of the uncertainties of location of the aircraft, of the inaccuracy of the terrain elevation database and of the lateral tolerance allowed in the tracking of the trajectory scheduled in the flight plan, a vertical profile of lateral margins of maneuver giving the largest terrain elevations catalogued in the terrain elevation database, encountered on the trajectory scheduled in the flight plan, along a widened navigation band including the navigation band itself, supplemented with right and left lateral margins, wherein the lateral dimensions of the margins of maneuver are dependent on the imposed turning radius and the positions, with respect to the aircraft, of the points of ground traces of the turns with the imposed radius corresponding, for the aircraft, to a vanishing of its speed component perpendicular to the course scheduled in the flight plan, the lateral dimensions of the margins of maneuver are taken to the equal, for one, the right one $W_r$, to the largest value out of:

the turning diameter 2R whose value is given by:

$$R = \frac{TAS^2}{g \cdot \tan\varphi_{roll}}$$

TAS being the amplitude of the air speed of the aircraft, $\phi_{roll}$ being the angle of roll of the aircraft during the turning maneuver, and the values taken by the component $x_t$ perpendicular to the course scheduled in the flight plan on the ground trace of the turn with imposed radius, at the times $t_{Wr1}$ and $t_{Wr2}$ of the first and second vanishings of the aircraft's speed component perpendicular to the course scheduled in the flight plan, $$W_r = \text{Max}[2R; x_t(t_{Wr1}); x_t(t_{Wr2})], \text{ and}$$

for the other, the left one $W_l$, to the largest of the values out of:

the turning diameter 2R, and the opposites of the values taken by the component $x_t$ perpendicular to the course scheduled in the flight plan on the ground trace of the turn with imposed radius, at the times $t_{Wl1}$ and $t_{Wl2}$ of the first and second vanishings of the aircraft's speed component perpendicular to the course scheduled in the flight plan $$W_l = \text{Max}[2R; -x_t(t_{Wl1}); -x_t(t_{Wl2})].$$

2. The method as claimed in claim 1, wherein the right and left lateral margins of maneuver are dimensioned so as to delimit sufficient areas to contain ground traces of disengagement maneuvers comprising at least one half-revolution performed, by the aircraft, flat, to the right or to the left of the trajectory scheduled in the flight plan.

3. The method as claimed in claim 2, wherein the right and left lateral margins of maneuver are dimensioned so as to delimit sufficient areas to contain the ground traces of disengagement maneuvers comprising at least one half-revolution performed, by the aircraft, flat, to the right or to the left of the trajectory scheduled in the flight plan, doing so having regard to a local wind W.

4. The method as claimed in claim 2, wherein the right and left lateral margins of maneuver are dimensioned so as to delimit sufficient areas to contain the ground traces of disengagement maneuvers comprising at least one half-revolution performed, by the aircraft, flat, with an imposed turning radius R, to the right or to the left of the trajectory scheduled in the flight plan.

5. The method as claimed in claim 4, wherein the right and left lateral margins of maneuver are dimensioned so as to delimit sufficient areas to contain the ground traces of disengagement maneuvers comprising at least one half-revolution performed, by the aircraft, with the imposed turning radius R, to the right or to the left of the trajectory scheduled in the flight plan, doing so having regard to the local wind W.

6. The method as claimed in claim 5, wherein the imposed turning radius R is a permitted minimum turning radius for the aircraft considered.

7. The method as claimed in claim 4, wherein the imposed turning radius R is a permitted minimum turning radius for the aircraft considered.

* * * * *